United States Patent
Chae et al.

(10) Patent No.: US 11,178,641 B2
(45) Date of Patent: Nov. 16, 2021

(54) SIGNAL TRANSMISSION/RECEPTION METHOD ASSOCIATED WITH PLATOON COMMUNICATION IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS, INC., Seoul (KR)

( * ) Notice: Subject to any disclaimer, the term of this patent is extended or adjusted under 35 U.S.C. 154(b) by 104 days.

(21) Appl. No.: 16/321,005

(22) PCT Filed: Jul. 25, 2017

(86) PCT No.: PCT/KR2017/007968
§ 371 (c)(1),
(2) Date: Jan. 25, 2019

(87) PCT Pub. No.: WO2018/021784
PCT Pub. Date: Feb. 1, 2018

(65) Prior Publication Data
US 2019/0166583 A1     May 30, 2019

Related U.S. Application Data

(60) Provisional application No. 62/368,154, filed on Jul. 28, 2016.

(51) Int. Cl.
*H04W 4/00* (2018.01)
*H04W 72/02* (2009.01)
(Continued)

(52) U.S. Cl.
CPC .......... *H04W 72/02* (2013.01); *H04J 3/1694* (2013.01); *H04J 3/245* (2013.01); *H04W 4/46* (2018.02);
(Continued)

(58) Field of Classification Search
CPC ..... H04W 72/04; H04W 88/08; H04W 76/00; H04W 72/02; H04W 4/46; H04W 4/70;
(Continued)

(56) References Cited

U.S. PATENT DOCUMENTS 9,788,287 B2 * 10/2017 Morita ................ H04W 72/085
2013/0301584 A1   11/2013 Addepalli et al.
(Continued)

FOREIGN PATENT DOCUMENTS

WO      2016017099      2/2016

OTHER PUBLICATIONS

Amoozadeh et al., Platoon management with cooperative adaptive cruise control enabled by VANET, Mar. 2015, ResearchGate.com (Year: 2015).*

(Continued)

*Primary Examiner* — Siren Wei
(74) *Attorney, Agent, or Firm* — Lee, Hong, Degerman, Kang & Waimey

(57) ABSTRACT

An embodiment of the present invention relates to a method for transmitting or receiving a signal associated with a platoon communication by a first terminal in wireless communication system, the method comprising the steps of: receiving group resource pool information of a terminal group moving in a platoon formation; selecting a sub-pool, which is to be used by the first terminal, in a group resource pool on the basis of the group resource pool information; and (Continued)

transmitting or receiving a signal to or from one or more terminals within the terminal group through the selected sub-pool.

12 Claims, 10 Drawing Sheets

(51) Int. Cl.
| | |
|---|---|
| *H04W 72/04* | (2009.01) |
| *H04W 84/18* | (2009.01) |
| *H04W 4/70* | (2018.01) |
| *H04W 4/46* | (2018.01) |
| *H04J 3/16* | (2006.01) |
| *H04J 3/24* | (2006.01) |
| *H04W 48/10* | (2009.01) |
| *H04W 48/16* | (2009.01) |
| *H04W 72/12* | (2009.01) |

(52) U.S. Cl.
CPC ............ *H04W 4/70* (2018.02); *H04W 48/10* (2013.01); *H04W 48/16* (2013.01); *H04W 72/048* (2013.01); *H04W 72/121* (2013.01); *H04W 84/18* (2013.01)

(58) Field of Classification Search
CPC ... H04W 48/10; H04W 48/16; H04W 72/048; H04W 72/121; H04J 3/1694; H04J 3/245
See application file for complete search history.

(56) References Cited

U.S. PATENT DOCUMENTS

| | | | |
|---|---|---|---|
| 2015/0215903 A1* | 7/2015 | Zhao ................... | H04W 72/082 |
| | | | 370/329 |
| 2015/0304973 A1* | 10/2015 | Ye ..................... | H04W 74/0816 |
| | | | 370/350 |
| 2016/0021526 A1* | 1/2016 | Niu ...................... | H04W 8/005 |
| | | | 370/230 |
| 2016/0157254 A1 | 6/2016 | Novlan et al. | |
| 2016/0212596 A1 | 7/2016 | Brahmi et al. | |
| 2016/0249297 A1* | 8/2016 | Oh ...................... | H04W 52/143 |
| 2016/0295565 A1* | 10/2016 | Kim .................. | H04W 72/0453 |
| 2016/0302252 A1* | 10/2016 | Wang ................ | H04W 72/1231 |
| 2016/0353416 A1* | 12/2016 | Takano ................. | H04W 8/005 |
| 2017/0280482 A1* | 9/2017 | Chatterjee ............. | H04W 8/005 |

OTHER PUBLICATIONS

PCT International Application No. PCT/KR2017/007968, Written Opinion of the International Searching Authority dated Nov. 2, 2017, 24 pages.

Amoozadeh, M. et al., "Platoon management with cooperative adaptive cruise control enabled by VANET," Research Gate, Vehicular Communications, Mar. 2015, pp. 110-123, 17 pages.

* cited by examiner (a)

(b)

(a)

(b)

SIGNAL TRANSMISSION/RECEPTION METHOD ASSOCIATED WITH PLATOON COMMUNICATION IN WIRELESS COMMUNICATION SYSTEM

CROSS-REFERENCE TO RELATED APPLICATIONS

This application is the National Stage filing under 35 U.S.C. 371 of International Application No. PCT/KR2017/007968, filed on Jul. 25, 2017, which claims the benefit of U.S. Provisional Application No. 62/368,154, filed on Jul. 28, 2016, the contents of which are all hereby incorporated by reference herein in their entirety.

TECHNICAL FIELD

Following description relates to a wireless communication system, and more particularly, to a method of transmitting and receiving a signal in a terminal group moving by forming a platoon and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE OF THE INVENTION

Technical Tasks

A technical task of the present invention is to provide a method of transmitting and receiving a signal in a terminal group moving by forming a platoon, a method of allocating a resource to terminals belonging to a terminal group, a method of selecting, transmitting, and receiving a resource of a terminal joining/leaving a group, etc.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

To achieve these and other advantages and in accordance with the purpose of the present invention, as embodied and broadly described, according to one embodiment, a method of transmitting and receiving a platoon communication-related signal, which is transmitted and received by a first terminal in a wireless communication system, includes the steps of receiving group resource pool information of a terminal group, which moves by forming a platoon, selecting a sub-pool to be used by the first terminal from a group resource pool based on the group resource pool information, and transmitting and receiving a signal with at least one or more terminals among terminals belonging to the terminal group via the selected sub-pool.

To further achieve these and other advantages and in accordance with the purpose of the present invention, according to a different embodiment, a first terminal transmitting and receiving a platoon communication-related signal in a wireless communication system includes a transmitter and receiver, and a processor, the processor configured to receive group resource pool information of a terminal group, which moves by forming a platoon, via the receiver, the processor configured to select a sub-pool to be used by the first terminal from a group resource pool based on the group resource pool information, the processor configured to transmit and receive a signal with at least one or more terminals among terminals belonging to the terminal group via the selected sub-pool.

The group resource pool may correspond to a plurality of sub-pools on which time division multiplexing (TDM) is performed.

The group resource pool information can be periodically signaled by a leader terminal of the terminal group.

A period of the periodically signaled group resource pool information may be longer than a message transmission period within the terminal group.

The method can further include the step of transmitting, by the first terminal, a joining request to the terminal group.

The group resource pool information can be transmitted by a terminal, which has received the joining request, in response to the joining request.

The sub-pool to be used by the first terminal can be selected based on a physical location of the first terminal in the terminal group.

Information on the sub-pool selected by the first terminal can be periodically signaled to terminals belonging to a group.

When the periodically signaled information on the sub-pool of the first terminal is not received during a predetermined time period, a second terminal can determine that the first terminal has left a group.

When the first terminal leaves the group, the sub-pool selected by the first terminal can be selected by a third terminal.

The sub-pool to be used by the first terminal may correspond to a sub-pool of which a lowest energy is measured in the group resource pool.

The first terminal can move together with the terminal group by forming a platoon by transmitting and receiving the signal.

Advantageous Effects

According to the present invention, it is able to allocate a resource to a terminal group while a half-duplex problem is solved and it is able to efficiently perform resource allocation/management of a terminal joining/leaving the terminal group.

It will be appreciated by persons skilled in the art that the objects that could be achieved with the present invention are not limited to what has been particularly described hereinabove and other objects that the present invention could achieve will be more clearly understood from the following detailed description.

DESCRIPTION OF DRAWINGS

The accompanying drawings, which are included to provide a further understanding of the present invention and are incorporated in and constitute a part of this application, illustrate embodiments of the present invention and together with the description serve to explain the principle of the disclosure. In the drawings.

BEST MODE

Mode for Invention

Figure 1:
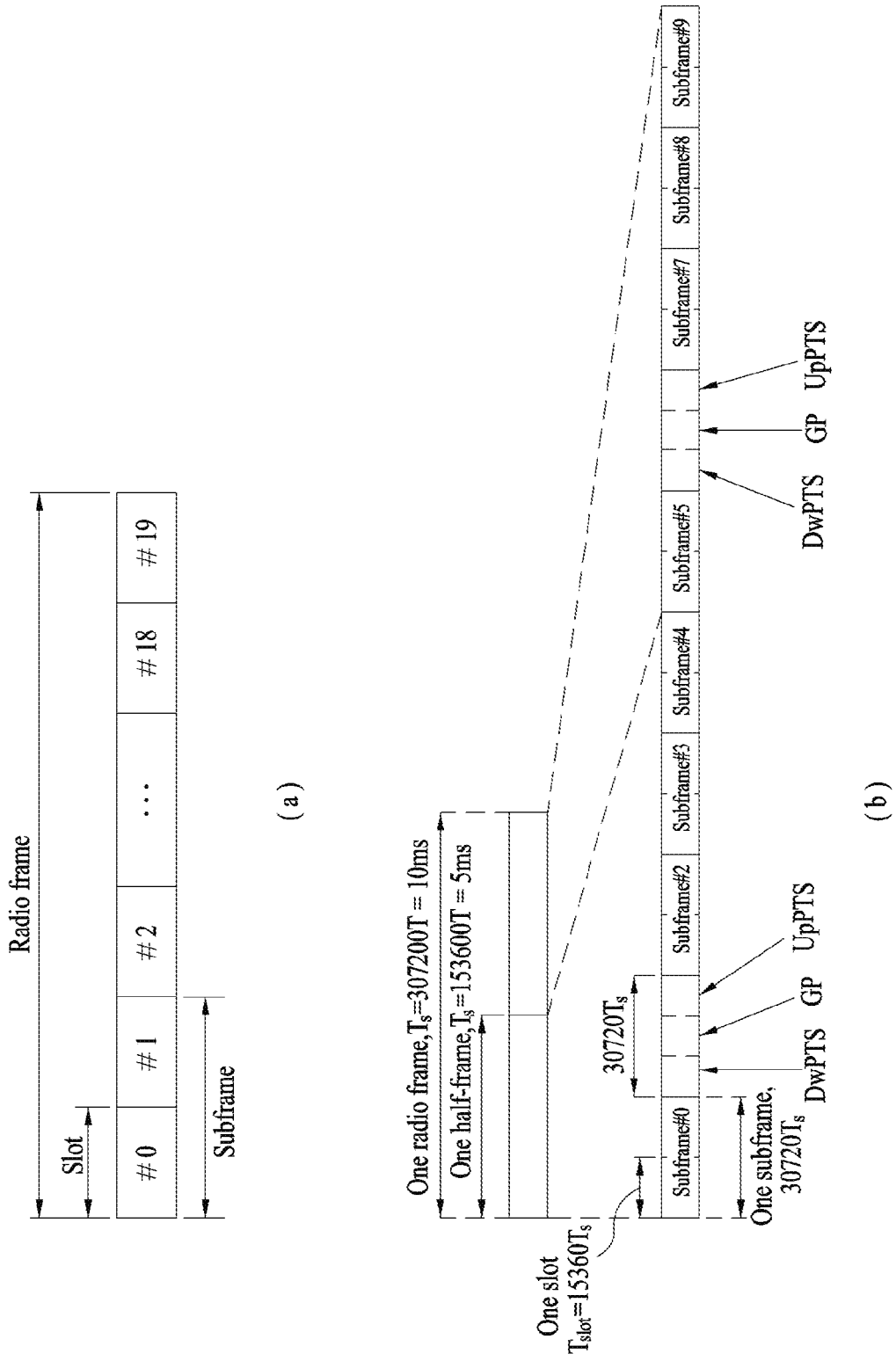
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
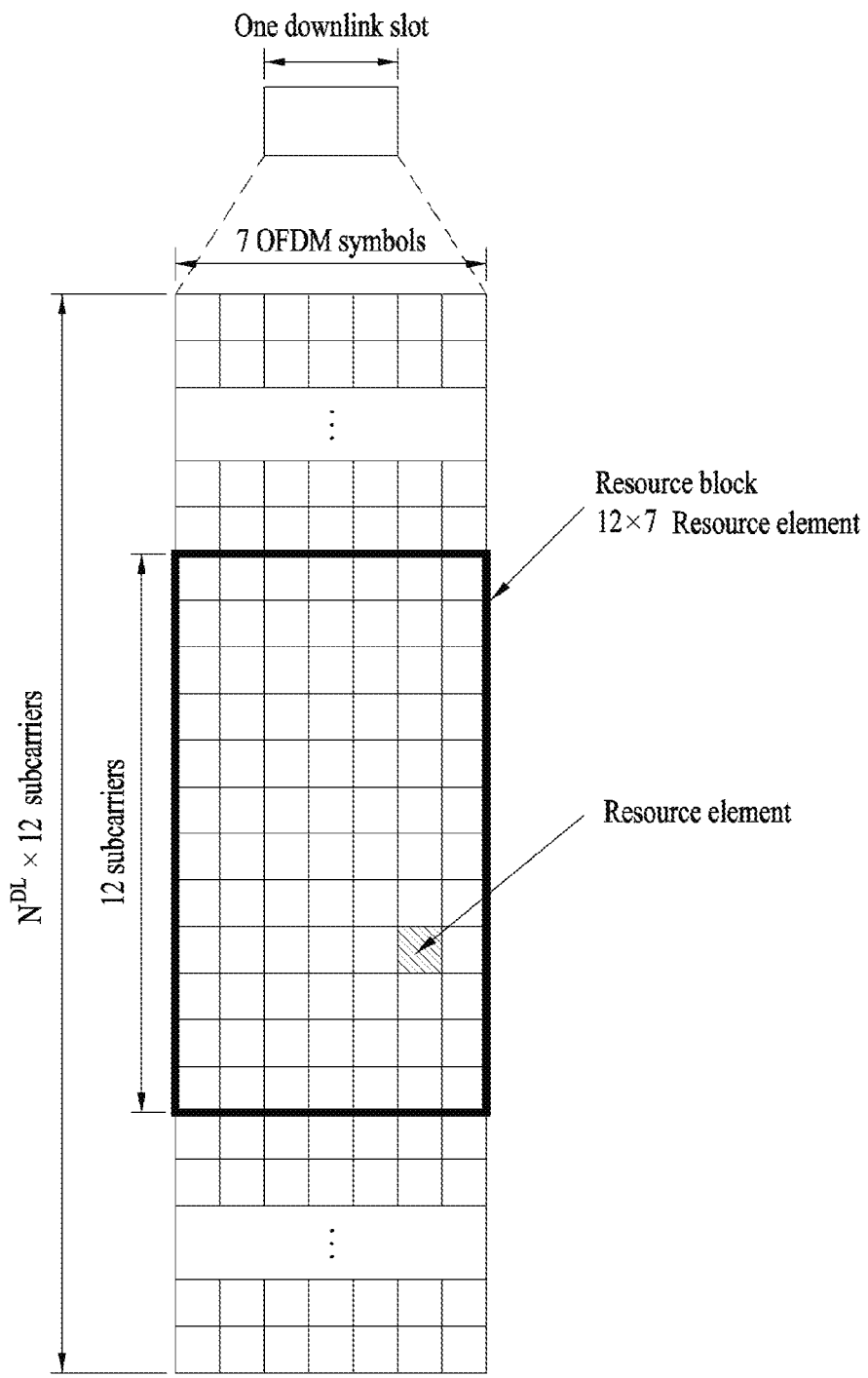
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
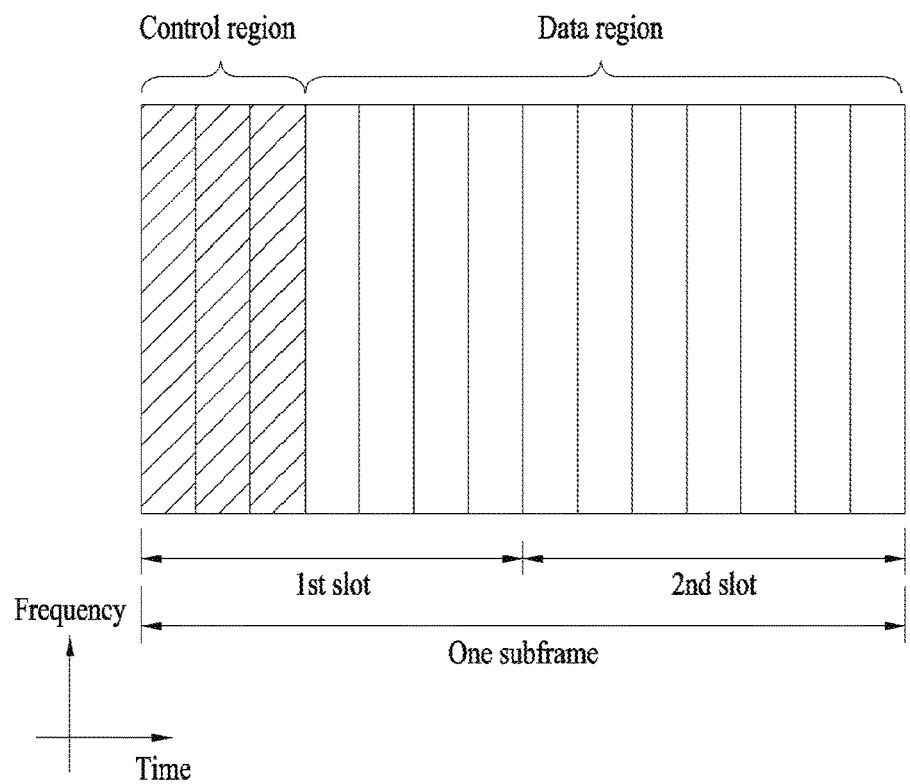
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
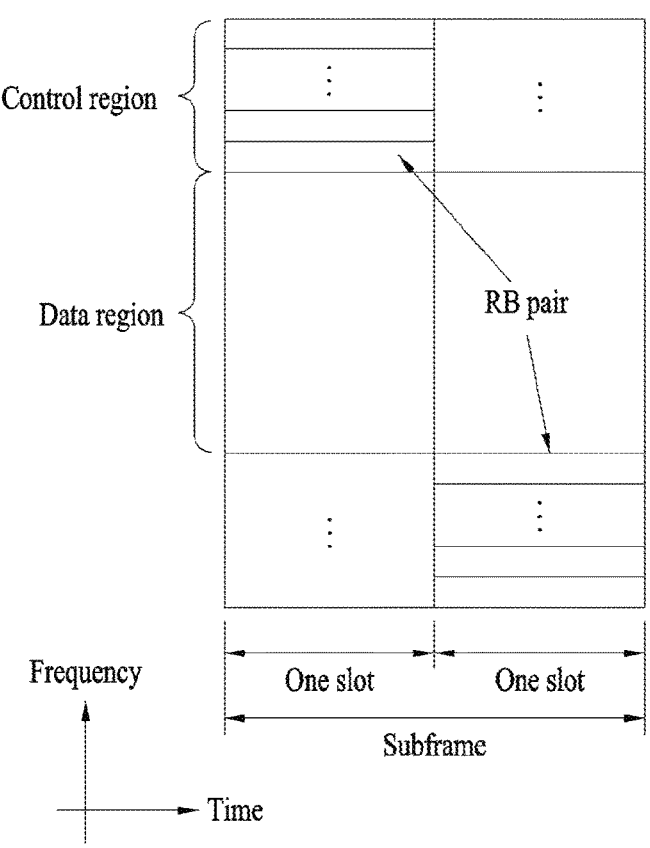
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
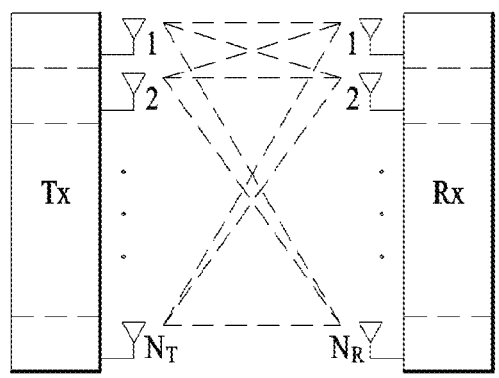
FIG. 5 is a view illustrating the configuration of a wireless communication system having multiple antennas.
Figure 5:
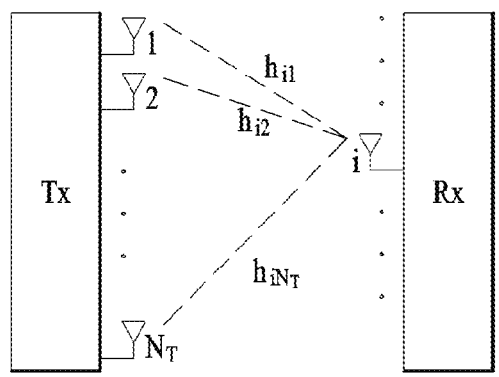

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \qquad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Assuming a case of configuring $N_T$ transmitted signals $x_1$, $x_2$, ..., $x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1$, $x_2$, ..., $x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

[Equation 5]

In Equation 5, $W_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

An AWGN (Additive White Gaussian Noise) is added to the actual channels after a channel matrix H. The AWGN $n_1$, $n_2$, ..., $n_{N_R}$ respectively added to the $N_R$ Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$

[Equation 10]

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
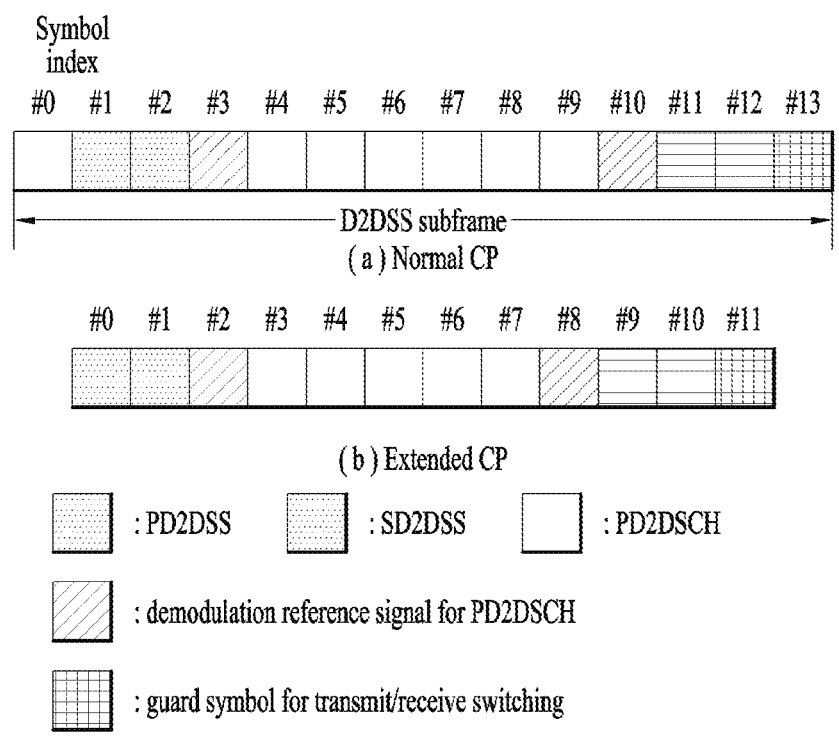
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
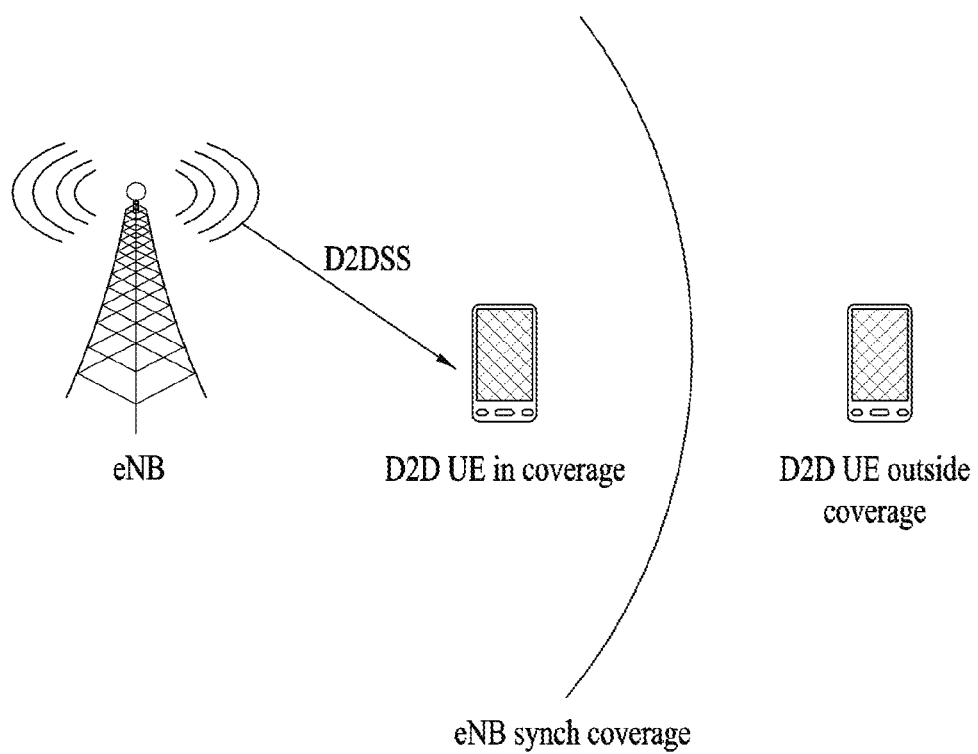
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
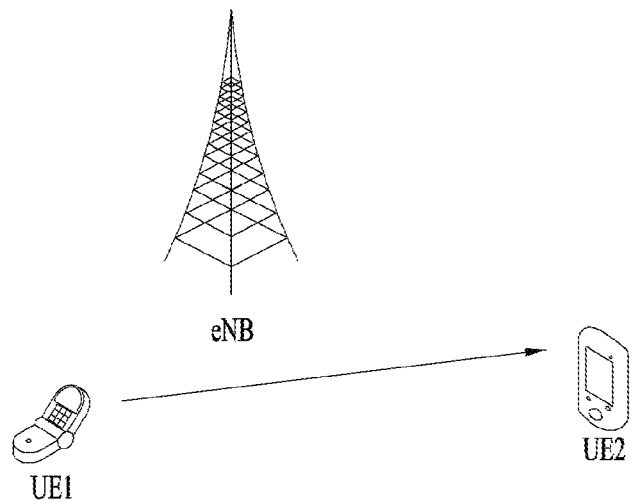
FIG. 8 is a view illustrating an exemplary D2D resource pool for D2D communication.
Figure 8:
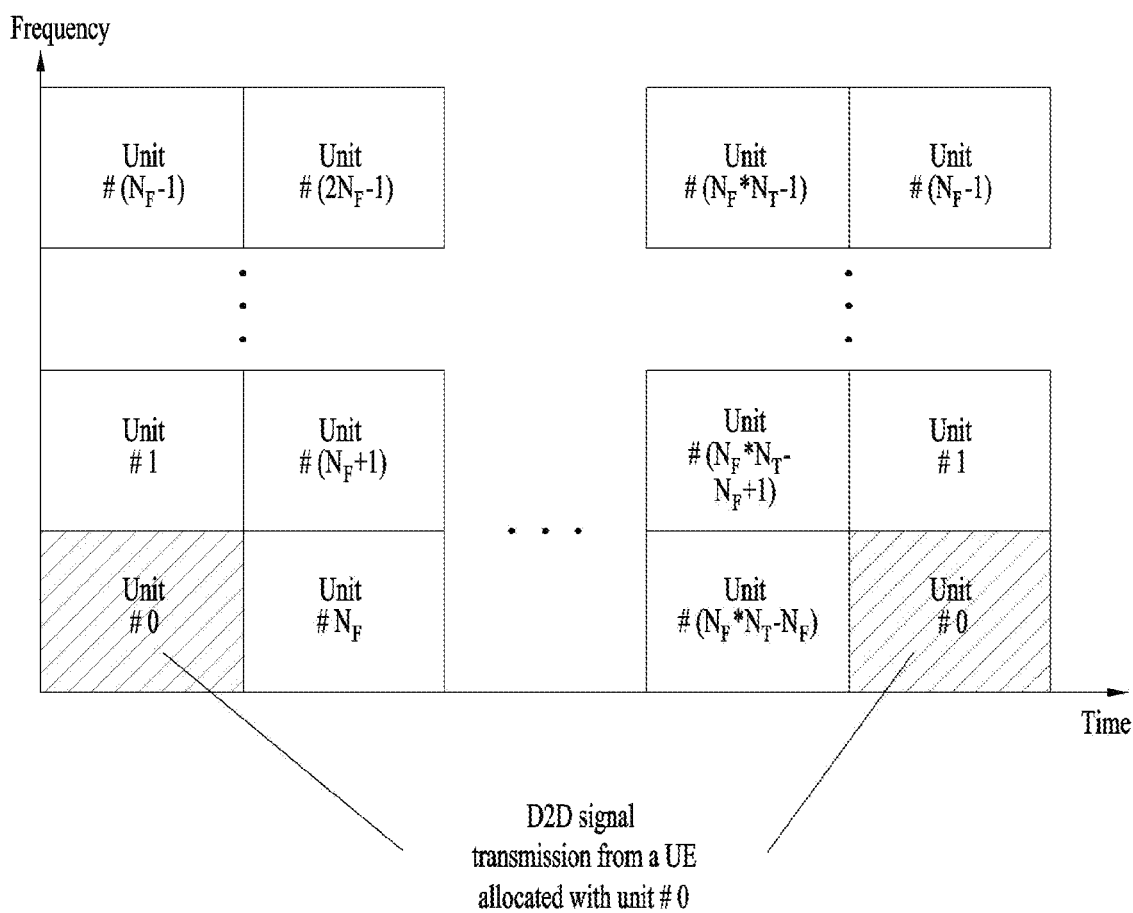

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
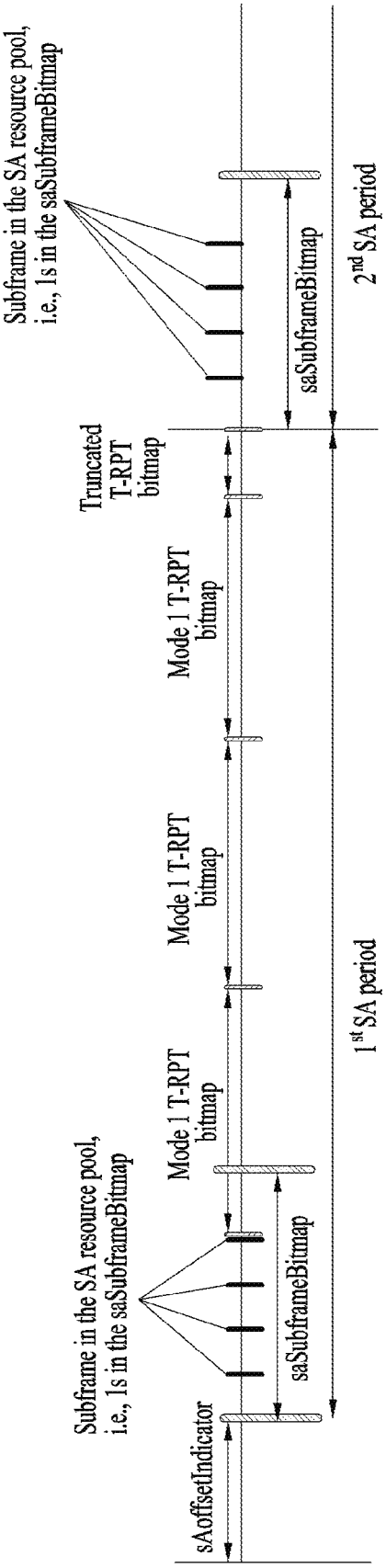
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to is set in a T-RPT bitmap in an indicated T-RPT, and transmits one medium access control layer protocol data unit (MAC PDU) four times.

Meanwhile, in V2V (vehicle to vehicle) communication, a CAM (cooperative awareness message) of a periodic message type, a DENM (decentralized environmental notification message) of an event triggered message type, and the like can be transmitted. The CAM can include dynamic status information of a vehicle such as direction and velocity, static data of a vehicle such as a size, and basic vehicle information such as external light status, path history, and the like. A size of the CAM may correspond to 50 to 300 bytes. The CAM is broadcasted and latency should be less than 100 ms. The DENM may correspond to a message which is generated when an accidental status such as malfunction of a vehicle, an accident, and the like occurs. A size of the DENM may be less than 3000 bytes. All vehicles located within a transmission range of the DENM can receive the DENM. In this case, the DENM may have a priority higher than a priority of the CAM. In this case, in the aspect of a single UE, the higher priority means that the UE preferentially transmits a message of a higher priority when messages are transmitted at the same time. Or, the higher priority means that the UE intends to preferentially transmit a message of a higher priority in time among a plurality of messages. In the aspect of a plurality of UEs, since a message of a higher priority receives less interference compared to a message of a lower priority, it may be able to lower a reception error rate. If security overhead is included in the CAM, the CAM may have a bigger message size.

Figure 10:
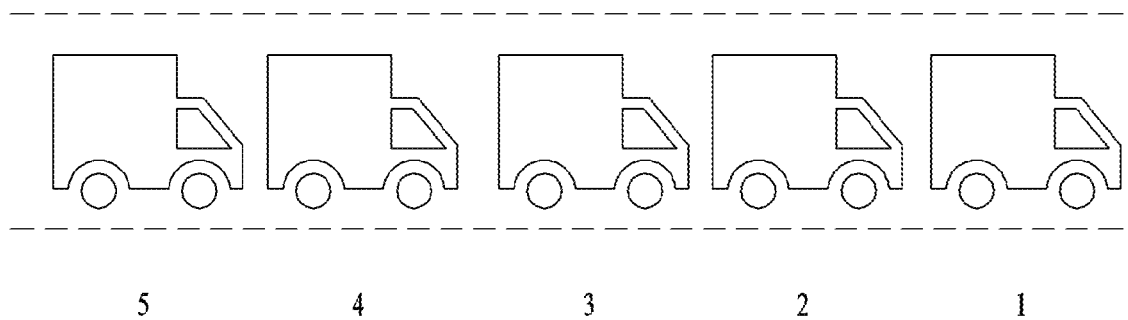
FIG. 10 is a diagram illustrating a terminal group which has formed a platoon.

As an example of V2X communication implementation examples, FIG. 10 illustrates an example that terminals are moving by forming a group. As illustrated in FIG. 10, a plurality of terminals can move by forming a platoon as a terminal group. Since a physical distance is very close between the terminals, a signal is very frequently transmitted and received between the terminals. In this case, it is necessary to reliably and stably transmit and receive the signal between the terminals. In addition, it is necessary to strictly observe delay time of message transmission/reception. Otherwise, due to the characteristic of group movement, since the terminals are unable to identify the existence of the counterpart terminal, it may lead to an accident. In particular, in case of the group movement, it is very important to select a radio resource between terminals not having a resource collision. In the following, in order to satisfy the requirement above, a method for terminals moving by forming a group to select a resource is explained. In particular, a method for a terminal (first terminal) joining or leaving a group to select a resource is mainly explained.

Embodiment

A first terminal receives information on a group resource pool of a terminal group, which moves by forming a platoon, and can select a sub-pool (or a partial radio (time/frequency) resource belonging to a resource pool of the terminal group) to be used by the first terminal from the group resource pool based on the information on the group resource pool. The first terminal can transmit and receive a signal with at least one or more terminals belonging to the terminal group via the selected sub-pool. By doing so, the first terminal joins a legacy terminal group and can move with the legacy terminal group by forming a platoon.

Figure 11:
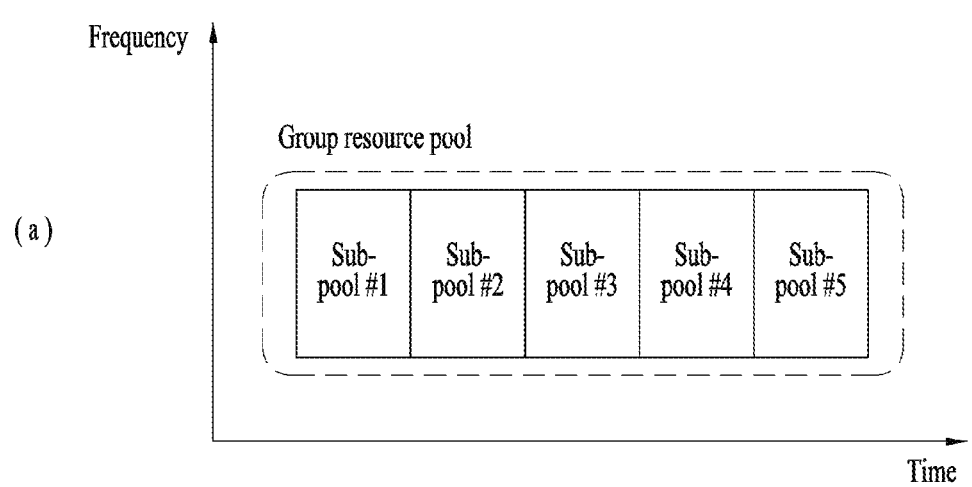
FIG. 11 is a diagram for explaining a resource structure/allocation according to an embodiment of the present invention.
Figure 11:
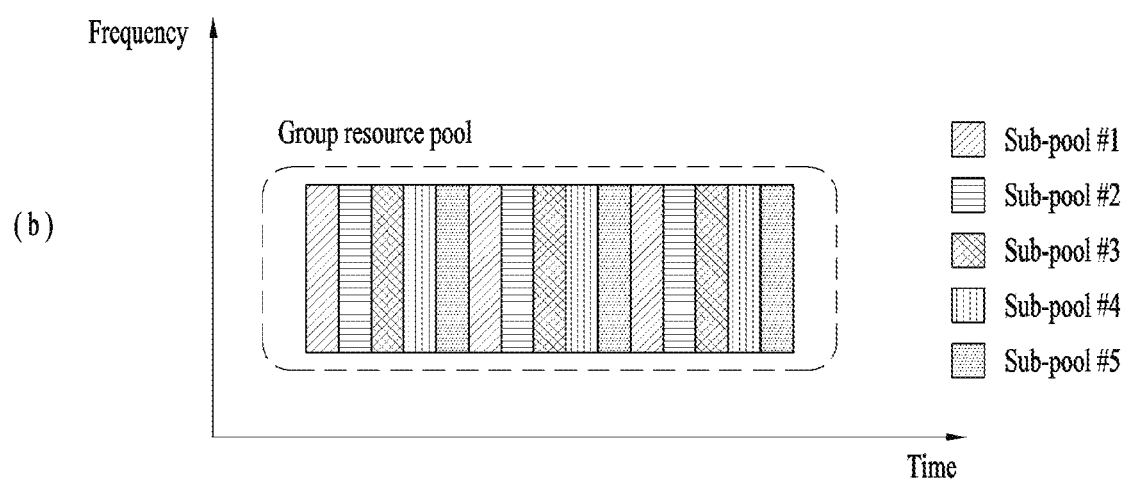

In this case, the group resource pool may correspond to a plurality of sub-pools on which time division multiplexing (TDM) is performed. By doing so, it is able to solve a half-duplex problem (when a specific terminal transmits a signal, the specific terminal is unable to receive a signal transmitted by a different terminal due to the signal transmitted by the specific terminal) between terminals belonging to the same group. The sub-pool selected from the group resource pool can be configured by a form illustrated in FIG. 11 (a) or an interleaved form illustrated in FIG. 11 (b). For example, assume that a group resource pool includes N number of subframes and F number of RBs. In this case, the N number of subframes can be divided based on the (current or maximum) number of members belonging to a group. (In this case, the N number of subframes can be equally or unequally divided. For example, when a group resource pool is unequally divided, more resources can be allocated to a specific terminal (e.g., a leader of the group or a terminal physically located at the first) belonging to a group.) Or, each of the N number of subframes may configure a sub-pool. A terminal can select one or more sub-pools. In this case, it is necessary to differently configure a sub-pool according to a terminal. And, it is necessary to configure a terminal belonging to a group not to use a sub-pool which is anticipated to be used by a different terminal belonging to the same group. In this case, when the terminal does not use the sub-pool which is anticipated to be used by a different terminal belonging to the same group, it means that the terminal does not transmit a message for forming and managing a group (e.g., a message for forming and maintaining a platoon) and control information as well.

Meanwhile, group resource pool information (time/frequency resource position, period, etc.) can be periodically signaled by a leader terminal of a terminal group or a group member terminal via physical layer/higher layer signaling. A period of the periodically signaled group resource pool information may be longer than a message transmission period in a terminal group. This is aimed at reducing unnecessary overhead.

On the other hand, the group resource pool information can be transmitted upon the request of a terminal. Specifically, when a first terminal transmits a joining request to a terminal group, a terminal, which has received the joining request, can transmit the group resource pool information to the first terminal in response to the joining request via physical layer/higher layer signaling.

In the following, methods for the first terminal, which has received the group resource pool information, to select a sub-pool from a group resource pool is explained in detail.

As a first method, a sub-pool to be used by the first terminal can be selected based on a physical location of the first terminal in a terminal group. In this case, the physical location may correspond to a location determined on the basis of a terminal positioned at the very first (in moving direction) in the terminal group that forms a platoon. Or, when a moving direction of a terminal is expressed by a vector, a location can be determined in a descending (or ascending) order of a vector size on the basis of a specific reference point. When a location is determined using the method above, an index of a sub-pool can be mapped from a reference terminal (e.g., the terminal positioned at the very first or the specific reference point). When a first terminal joins a group and positions of terminals belonging to the legacy group change due to the first terminal, the terminals can change a position of a sub-pool.

A terminal belonging to a group can periodically or aperiodically signal information on a sub-pool used by the terminal to neighboring terminals. In particular, information on a sub-pool selected by a first terminal can be periodically or aperiodically signaled to terminals belonging to the same group. When the periodically signaled information on the sub-pool selected by the first terminal is not received during predetermined time, a second terminal can determine it as the first terminal has left the group. When the first terminal leaves the group, the sub-pool selected by the first terminal can be selected by a third terminal.

As a second method, the first terminal can (randomly) select a sub-pool of which low energy or energy less than a predetermined threshold is measured from a group resource pool (according to a predetermined rule). When a terminal newly joins a specific terminal group, the terminal measures energy from each of sub-pools and selects a sub-pool of which lowest energy or energy less than a predetermined threshold is measured (randomly or according to a sub-pool index (high or low)). According to the second method, since a terminal autonomously selects a sub-pool without an indication of a specific terminal belonging to the same group, it is able to reduce signaling overhead.

As a third method, a sub-pool to be used by the first terminal can be directly signaled by a specific terminal (group leader, etc.) belonging to the same group. Specifically, for example, a group leader allows a terminal intending to join a group to use a resource and may be then able to signal an index of a sub-pool to the terminal together with a resource use allowance or without the resource use allowance.

As briefly mentioned in the foregoing description, the first terminal may leave a group. In order to leave the group, the first terminal can transmit a (physical layer or higher layer) signal indicating that the first terminal is going to leave the group in a minute or a signal indicating that the terminal is not going to use a currently used resource soon or later to a specific terminal or all terminals belonging to the group. Having received the signal, a terminal assumes that a sub-pool used by the first terminal is empty after prescribed time elapses from the timing at which the signal is received and may be then able to attempt to use the sub-pool. In order to avoid a resource collision, information indicating that a terminal belonging to a group leaves the group or information indicating that the terminal is not going to use a currently used resource soon or later can be signaled to a specific terminal or a part of terminals belonging to the group. To this end, a timer or a counter may operate from the timing at which the information is signaled. In order to secure reliability for a group leaving process, a signal indicating whether or not a terminal leaves a group can be transmitted several times. When a terminal receives the information more than a predetermined count, the terminal operates a timer/counter. When prescribed time elapses after the timer/counter operates, the terminal may determine that a sub-pool used by the terminal, which has transmitted the signal, is available.

As mentioned earlier in the sub-pool selection, when a specific terminal periodically transmits information on the use of a sub-pool to neighboring terminals belonging to the same group, the terminals can implicitly determine whether or not the specific terminal leaves the group by receiving the message. For example, when the information on the use of a sub-pool used by the specific terminal is not received during a predetermined time period or is not (continuously) received for a predetermined count, it may determine it as the specific terminal has left the sub-pool. Hence, it may allow the neighboring terminals to use the sub-pool. However, in this case, since whether or not a specific message is received varies depending on a terminal, information on whether or not a sub-pool is used can be differently identified according to a terminal. As a result, when a new terminal joins a group, the new terminal may receive different information. In this case, the new terminal may determine that a union of sub-pools used by terminals belonging to a legacy group is already used. The new terminal can select a sub-pool not in use from the sub-pools.

When terminals belonging to a group or a specific terminal signals information on sub-pools used by the terminal(s) or information on sub-pools used in a group resource pool in response to a periodic/aperiodic/specific event, a newly joining terminal may use a sub-pool indicated by the specific terminal among the remaining sub-pools not in use. Or, the newly joining terminal may randomly select a sub-pool from among the remaining sub-pools not in use and use the selected sub-pool.

Meanwhile, when a terminal uses a specific sub-pool, if a status of the specific sub-pool is poor, the terminal may change the specific sub-pool. In this case, similar to a joining or leaving operation, the terminal can transmit a signal indicating that the terminal is not going to use the specific sub-pool to neighboring terminals via physical layer signaling or higher layer signaling. And, a specific terminal belonging to the same group may indicate the terminal to use a different sub-pool. Or, the terminal can autonomously transmit a signal indicating that the terminal is going to use a specific sub-pool to the neighboring terminals. When the terminal changes a sub-pool, the terminal can signal a measurement result measured at the sub-pool to the neighboring terminals.

A terminal corresponding to a member of a group can change a sub-pool of the terminal whenever a new packet is transmitted. In particular, a position of a sub-pool can be changed according to a predetermined pattern. The aforementioned contents can be applied not only to D2D communication, but also uplink or downlink. In this case, the proposed method can be used by a base station, a relay node, and the like.

In the foregoing description, for clarity, a signal transmitted by a vehicle terminal is referred to as a CAM or a DENM. However, the principle of the present invention can also be applied to signals not referred to as the CAM or the DENM. When a signal is transmitted in a manner of including information on the proposed method, the signal can be included in the scope of the present invention.

Examples for the aforementioned proposed methods can also be included as one of implementation methods of the present invention. Hence, it is apparent that the examples are regarded as a sort of proposed schemes. The aforementioned proposed schemes can be independently implemented or can be implemented in a combined (aggregated) form of a part of the proposed schemes. It may be able to configure an eNB to inform a UE of information on whether to apply the proposed methods (information on rules of the proposed methods) via a predefined signal (e.g., physical layer signal or upper layer signal). Or, it may be able to define a rule that a Tx UE signals the information to an Rx UE or the Rx UE requests the information to the Tx UE.

Configurations of Devices for Embodiments of the Present Invention

Figure 12:
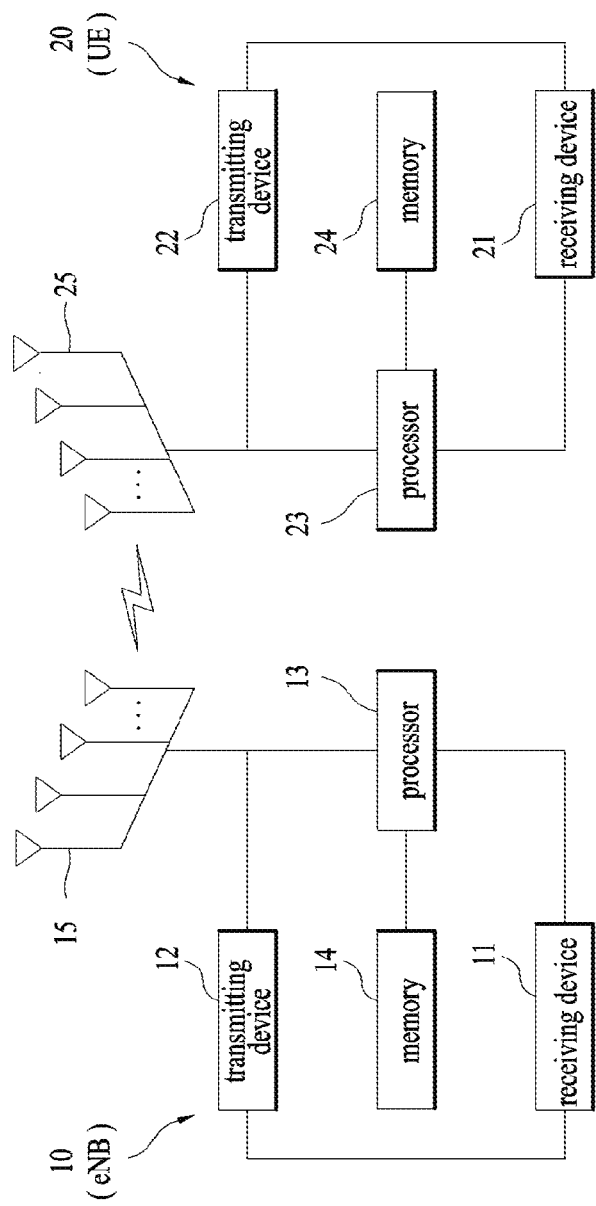
FIG. 12 is a diagram illustrating configurations of a transmission apparatus and a reception apparatus.

FIG. 12 is a diagram for configurations of a transmit point apparatus and a UE.

Referring to FIG. 12, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Besides, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 12, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above. Specifically, the processor receives group resource pool information of a terminal group moving by forming a platoon via the receive module, selects a sub-pool to be used by a first terminal from a group resource pool based on the group resource pool information, and can transmit and receive a signal with at least one or more terminals belonging to the terminal group via the selected sub-pool.

In addition, the processor 23 of the UE device 20 may perform a function of processing information received by the UE device 20, information to be transmitted by the UE device 20, and the like. The memory 24 may store the processed information during a prescribed time period and be substituted with a component such as a buffer (not shown in the drawing) or the like.

The configurations of the transmission point device and the UE device may be implemented such that the above-described embodiments can be independently applied or two or more thereof can be simultaneously applied, and redundant description is omitted for clarity The description of the transmission point device 10 in FIG. 12 may be equally applied to a relay as a downlink transmission entity or an uplink reception entity, and the description of the UE device 20 in FIG. 12 may be equally applied to a relay as a downlink reception entity or an uplink transmission entity.

The embodiments of the present invention may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

What is claimed is:

1. A method performed by a first terminal in a wireless communication system, the method comprising:
    receiving at least one sidelink synchronization signal to synchronize to at least one terminal in a terminal group;
    receiving group resource pool information including information of a plurality of sub-pools which is allocated to each of terminals of the terminal group;
    selecting at least one of the sub-pools to be used by the first terminal from a group resource pool based on the group resource pool information; and
    transmitting, to the at least one terminal belonging to the terminal group, data via the at least one of the sub-pools,
    wherein the terminals of the terminal group form a platoon,
    wherein information on the at least one of the sub-pools is periodically signaled to the at least one terminal belonging to the terminal group, and
    wherein, based on the signaling of the periodically signaled information being failed during a predetermined time period, a leaving of the first terminal is determined at the at least one terminal.

2. The method of claim 1, wherein the group resource pool includes a plurality of sub-pools that are time division multiplexed in the group resource pool.

3. The method of claim 1, wherein the group resource pool information is periodically signaled by a leader terminal of the terminal group.

4. The method of claim 3, wherein a period of the periodically signaled group resource pool information is longer than a message transmission period within the terminal group.

5. The method of claim 1, further comprising transmitting, by the first terminal, a joining request to the terminal group.

6. The method of claim 5, wherein the group resource pool information is transmitted by a terminal, which has received the joining request, in response to the joining request.

7. The method of claim 2, wherein the at least one of the sub-pools to be used by the first terminal is selected based on a physical location of the first terminal in the terminal group.

8. The method of claim 1, wherein, based on the leaving of the first terminal being determined, the at least one of the sub-pools is available.

9. The method of claim 2, wherein the at least one of the sub-pools to be used by the first terminal corresponds to a sub-pool of which a lowest energy is measured in the group resource pool.

10. The method of claim 1, wherein the first terminal moves together with the terminal group by forming a platoon by transmitting and receiving data.

11. A first terminal in a wireless communication system, the first terminal comprising:
    a transceiver; and
    a processor coupled to the transceiver and configured to:
    receive at least one sidelink synchronization signal to synchronize to at least one terminal in a terminal group;
    receive group resource pool information including information of a plurality of sub-pools which is allocated to each of terminals of the terminal group;
    select at least one of the sub-pools to be used by the first terminal from a group resource pool based on the group resource pool information; and
    transmit, to the at least one terminal belonging to the terminal group, data via the at least one of the sub-pools,
    wherein the terminals of the terminal group form a platoon,
    wherein information on the at least one of the sub-pools is periodically signaled to the at least one terminal belonging to the terminal group, and
    wherein, based on the signaling of the periodically signaled information being failed during a predetermined time period, a leaving of the first terminal is determined at the at least one terminal.

12. The first terminal of claim 11, wherein the group resource pool includes a plurality of sub-pools that are time division multiplexed in the group resource pool.

* * * * *